(No Model.)
J. B. DAVIS.
PIPE CLAMP AND HOLDER.
No. 484,410. Patented Oct. 18, 1892.
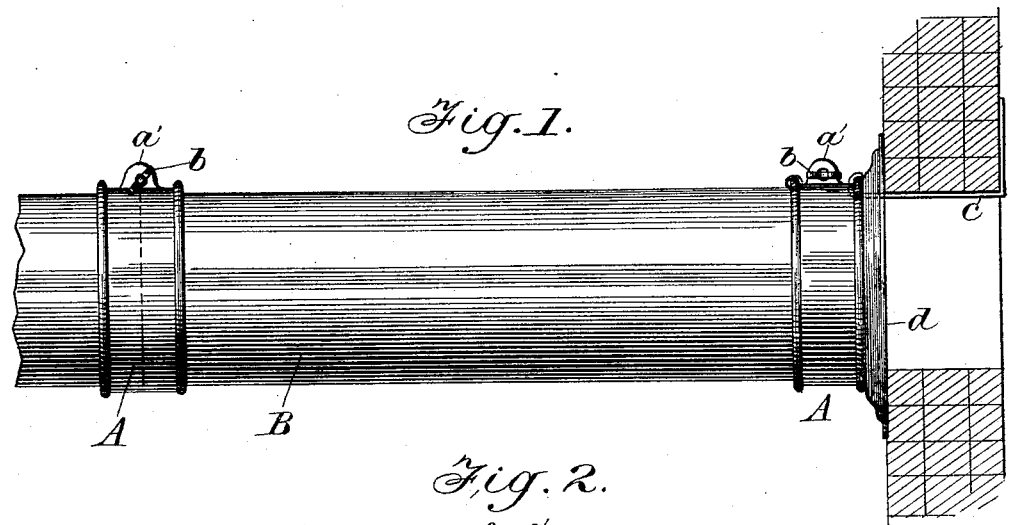
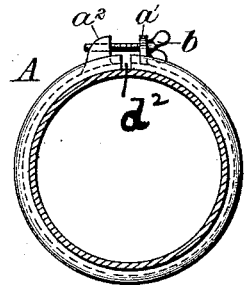
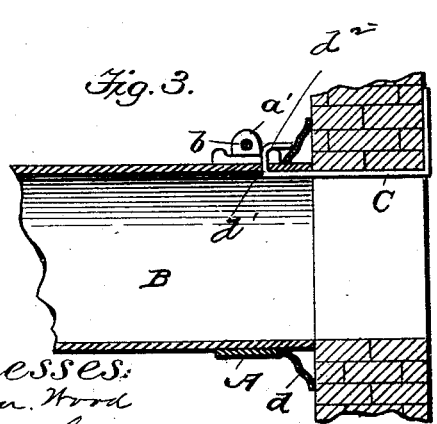
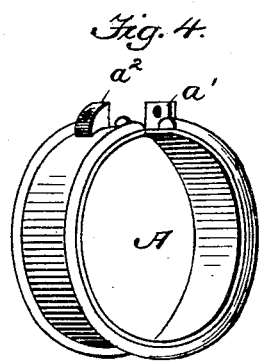
Witnesses:
Aaron Wood
W. E. Stewart
Inventor
John B. Davis
by E. H. Gleason
atty

UNITED STATES PATENT OFFICE.

JOHN BROOKS DAVIS, OF MOLINE, ASSIGNOR OF ONE-HALF TO LOUIS ROSENSTEIN, OF ROCK ISLAND COUNTY, ILLINOIS.

PIPE CLAMP AND HOLDER.

SPECIFICATION forming part of Letters Patent No. 484,410, dated October 18, 1892.

Application filed May 15, 1891. Serial No. 392,907. (No model.)

*To all whom it may concern:*

Be it known that I, JOHN BROOKS DAVIS, a citizen of the United States, residing at Moline, in the county of Rock Island and State of Illinois, have invented certain new and useful Improvements in Pipe Clamps and Holders; and I do hereby declare the following to be a full, clear, and exact description of the invention, such as will enable others skilled in the art to which it appertains to make and use the same.

My invention relates to improvements for securing the joint of metal pipes, and more especially stovepipes; and its object is to provide for and hold joints of pipe from pulling apart when connected together for use and to obviate the need of rivets or wires to hold together long ranges of pipe. I attain this object by the devices herein described, and illustrated in the accompanying drawings, in which—

Figure 1 is a sectional view of two joints of pipe placed together and secured by a metal clamp, and also brace or holder and collar, as combined and held by a clamp. Fig. 2 is a view of the band or clamp, showing the lugs for screw designed for use in tightening the clamp to the pipe. Fig. 3 represents a sectional view of the improvement, and Fig. 4 represents a perspective view of the band or clamp.

Similar letters refer to similar parts throughout the several views.

The band or clamp A may be made of any kind of suitable metal and of any width desired, with beaded or turned edges to clamp and hold tightly when placed around and over the pipe-joint. It has securely attached at each end lugs $a'$ $a^2$, fitted for a screw, which may be a thumb or ordinary screw $b$, serving to draw together and tighten the clamp around the pipe. Lug $a'$ has the screw-hole clear for the screw to pass into lug $a^2$, which is elongated and has a female screw through it. Space is given between lugs $a'$ and $a^2$ to allow the clamp when loosened to be slipped off without drawing the screw entirely out. Brace $c$ is a flat strip of metal having the inner end turned at right angles to engage the chimney and its outer end bent at right angles and passed through an opening $d'$ in the pipe B and then parallel with the pipe and through the openings $d^2$, between the adjacent ends of the band, as seen in Figs. 2 and 3, the outer end resting against the collar $d$. It will of course be understood that the pipe B is to be supported at its outer end. If connected directly to the neck or nipple on the stove and extending horizontally, the pipe B will be generally very short, or, if a terminal of an uptake, the uptake will be supported on a collar on the stove and the pipe B supported and connected with the uptake by an elbow in the usual manner. The manner of supporting the outer end forms no part of this invention and, being common, is not illustrated. I am aware that prior to my invention a pipe-clamp and a holder to secure pipes in a chimney have been made and used, in a separate manner. I therefore do not claim such a combination, broadly; but What I do claim, and desire to secure by Letters Patent, is—

In a pipe clamp or holder, the combination, with the chimney, of the pipe having an opening, the clamping-band around the pipe and having a space between its adjacent ends coincident with the opening in the pipe, and the brace having one end engaging the chimney and the other end passed through the opening in the pipe and through the space between the ends of the band and engaged by the said ends, said end being bent substantially as shown, and for the purpose specified.

In testimony whereof I have affixed my signature in presence of two witnesses.

JOHN BROOKS DAVIS.

Witnesses:
LEWIS MEESE,
M. E. STEWART.